(Model.)
C. R. TAYLOR.
RUNNING GEAR.
No. 278,290. Patented May 22, 1883.
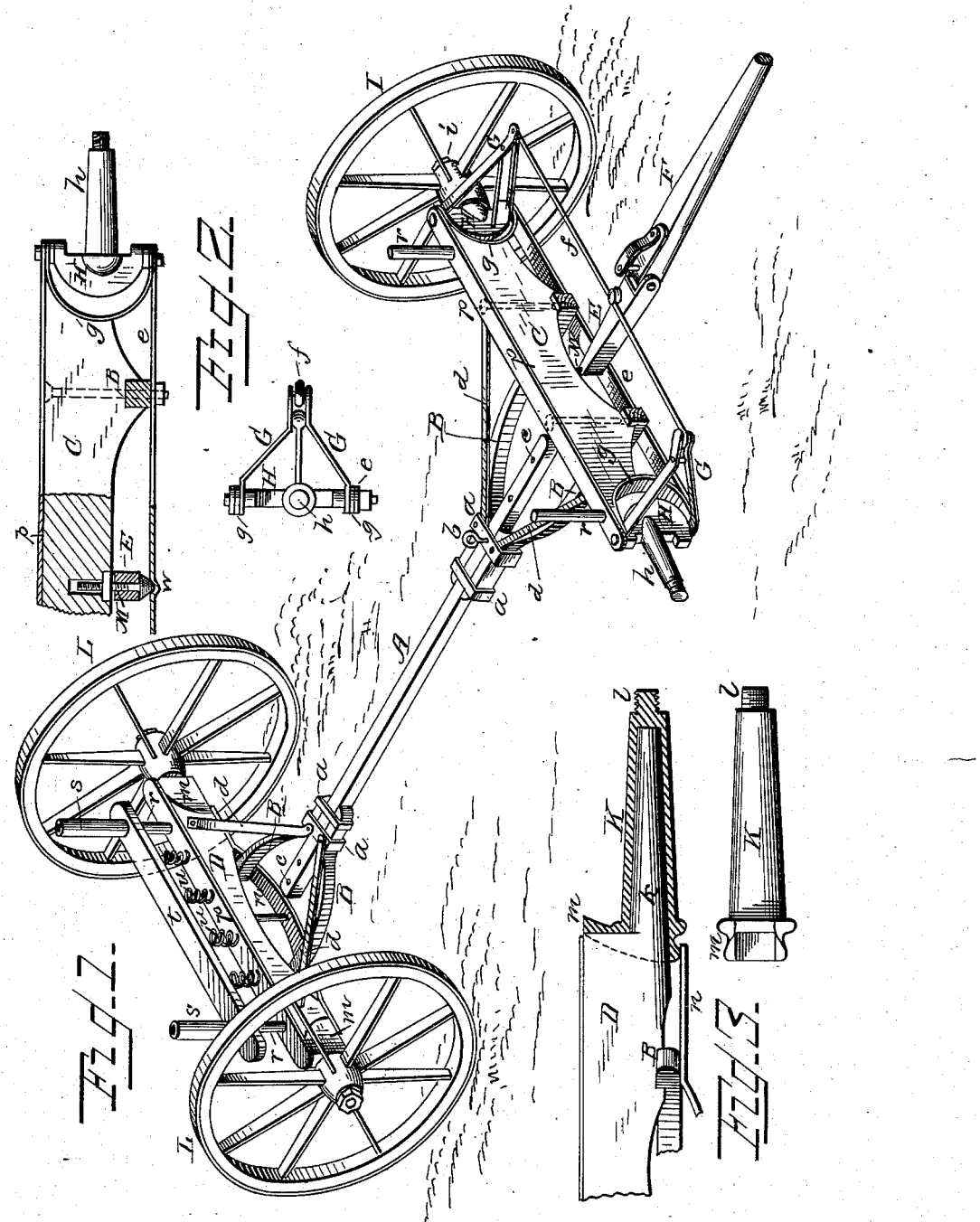
WITNESSES
F. L. Ourand
N. E. Oliphant
INVENTOR
Chester R. Taylor,
per Chas. H. Fowler,
Attorney

UNITED STATES PATENT OFFICE.

CHESTER R. TAYLOR, OF JACKSON, MICHIGAN.

RUNNING-GEAR.

SPECIFICATION forming part of Letters Patent No. 278,290, dated May 22, 1883.

Application filed October 23, 1882. (Model.)

*To all whom it may concern:*

Be it known that I, CHESTER R. TAYLOR, a citizen of the United States, residing at Jackson, in the county of Jackson and State of Michigan, have invented certain new and useful Improvements in Running-Gear; and I do hereby declare that the following is a full, clear, and exact description of the same, reference being had to the annexed drawings, making a part of this specification, and to the letters and figures of reference marked thereon.

Figure 1 of the drawings is a perspective view of my invention; Figs. 2 and 3, detail views on an enlarged scale of different parts of my invention.

The present invention has relation to certain new and useful improvements in the running-gear of wagons and other like vehicles; and it consists in the details of construction, substantially as shown in the drawings and hereinafter described and claimed.

In the accompanying drawings, A represents the reach, adjustably connected at both ends to the braces B, said braces being bolted or otherwise suitably connected, respectively, to the rear and forward axles, C D. Around the inner ends of the braces B are secured metal straps $a$, which not only strengthen the point of connection between the reach and braces, but form guides for the reach when adjusted to shorten or lengthen the wagon. When the reach is once adjusted it is held firmly in position by a bolt or pin, $b$, passing through the straps $a$ and through one of a series of holes, $c$, in the reach. Braces $d$ are secured to the straps $a$ and to the inner side of the axles C D, whereby increased strength is obtained between the braces B and axles.

To the under side of the axle C is bolted or otherwise secured a truss-bar, $e$, or, if desired, may be bolted to the braces B, as shown, and between said bar and axle is pivoted a tongue, E, which in turn has pivoted to it the wagon-pole F.

To the upper side of the tongue E is connected a rod, $f$, extending from each side thereof to the ends of the axle, where it is pivoted to the outer ends of guide-braces G.

The ends of the axle C are cut away to receive semicircular bars $g$, said bars being secured to the axle and to the ends of the truss-bar $e$ by the same bolt which connects the guide-braces G, said guide-braces being pivotally connected to the ends of the axle.

Pivoted to the ends of the axle C and to the bars $e$ $g$ are crescent-shaped yokes H, formed with or having the axle-arms $h$, to which are secured the wheels I by nuts $i$, engaging with the screw-threaded ends of the axle-arms.

It will be seen by the above construction that the front wheels of the wagon, when either strike an obstruction, it will not jerk the neck-yoke end of the wagon-pole in a direction laterally toward the opposite wheel, thus making the wagon more reliable, easy, and satisfactory to the driver. The peculiar form of the crescent-shape yokes H, the semicircular bars $g$, in connection with the double guide-braces G, truss-bar $e$, and pivoted rod $f$, form together a strong, durable, and effective running-gear for the forward axle, as well as simple and inexpensive.

The rear axle, D, is formed with the usual axle-arms, $k$, and over and upon said arms are secured the hollow shell-skeins K. These shell-skeins K are tapering to conform to the taper of the axle-arms $k$, and are closed at their outer ends, and terminate in a screw-threaded nipple, $l$, to receive a nut to hold the hind wheels, L, upon the skeins. The skeins K, at their inner ends, are cast with socket-plates $m$, which embrace the sides of the axle D, and are firmly secured thereto by suitable bolts, which pass through each end of the truss-bar $n$ and through the under side of the socket-plates and into or partly through the axle. Thus the skeins K, with their socket-plates, will be kept in position upon the axle without having holes in the end of said skeins and through the wooden axle-arm, which would tend to weaken the arms and render them liable to break. It will be seen that the outer ends of the skeins K are closed or cast solid. Thereby no wagon-grease can work into the skein and upon the axle-arm, which would frequently cause the skeins to work loose, slip off, and break.

The tongue E is pivoted by a bolt, M, usually termed a "T-bolt," the lower end resting in a socket, $w$, formed in the truss-bar $e$, the bolt screwing up into the axle to adjust the tension of the same when desired.

The axles C D, which are of wood, have each a metal plate, p, secured to the upper side, and also stakes r, screw-threaded upon their lower ends, and pass through the plate and are screwed into the axle. Over and upon the stakes r are placed sockets s, connected to a cross-bar, t, and passing through it near its ends, and between the cross-bar t and plate p are coiled springs u, thus forming a yielding or spring support for the wagon-body.

It will be noticed that the axle-arms h, having the yokes H, by which they are pivoted to the semicircular bars g, are over or nearly over the tread of the front wheels, thus leaving little or no leverage to move the outer end of the wagon-pole to the right or left when the wheels strike an obstruction.

Although I have shown my invention as applied to wagons, it is equally applicable to vehicles of every description.

Having now fully described my invention, what I claim as new, and desire to secure by Letters Patent, is—

The axle C, cut away at its ends to form segmental seats or bearing-surfaces, as shown, and having the plate p and truss-bar e, which project beyond the end of said axle, in combination with the semicircular bars g, bearing against the segmental seats at the end of the axle, and secured to the projecting ends of the plate and truss-bar, and the pivoted crescent-shaped yokes H, with axle-arms h and means, substantially as described, for operating them, as set forth.

In testimony that I claim the above I have hereunto subscribed my name in the presence of two witnesses.

CHESTER R. TAYLOR.

Witnesses:
L. H. LUDLOW,
W. H. VAN HORN.